May 30, 1950     F. W. PERSON, JR     2,509,782
TANK FITTING AND METHOD OF MAKING THE SAME
Filed Feb. 9, 1948
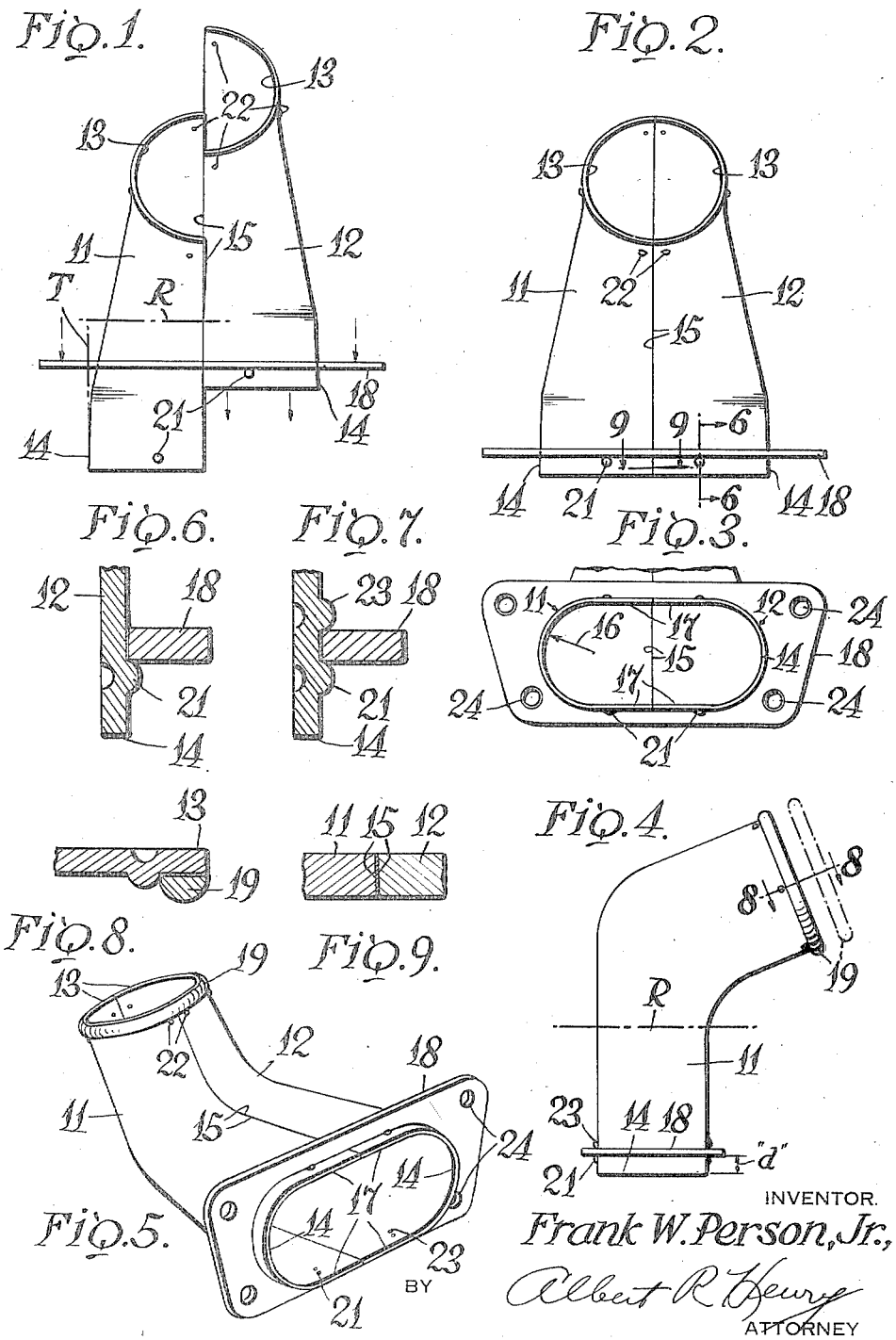
INVENTOR.
Frank W. Person, Jr.,
BY Albert R. Henry
ATTORNEY Patented May 30, 1950

2,509,782

UNITED STATES PATENT OFFICE 2,509,782

TANK FITTING AND METHOD OF MAKING THE SAME

Frank W. Person, Jr., Kenmore, N. Y., assignor to Fedders-Quigan Corporation, Buffalo, N. Y.

Application February 9, 1948, Serial No. 7,273

5 Claims. (Cl. 285—211)

This invention relates to tank fittings and a method of making the same, and it has particular reference to the provision of a tank fitting applicable to an automobile radiator tank or header, and through which the radiator may be connected to the engine water jacket through a hose.

For many years it has been common practice to cool an internal combustion engine by water circulating around the cylinders to and from an air cooled radiator—the connections being made through short lengths of hose. This has necessitated a fitting for the radiator headers or tanks to which an end of the hose can be connected. Such fittings have been commonly made as iron castings, which, after cleaning and galvanizing, have been brazed into openings formed in the radiator tanks. The practice is reflected in the vast number of automobiles which have been manufactured in this country. While the costs of cast fittings, and the inevitable percentage of defective castings, have long been sources of annoyance, no one, to my knowledge, has as yet offered a practical, cheaper, and reliable replacement.

According to the present invention, an improvement is made in the art by forming the fitting from a plurality of separate, easily stamped or pressed sheet metal members, which are thereafter assembled and are interconnected by fused bonding metal, such as solder or brazing composition. There results an inexpensive, light weight, tough and durable fitting, which may be readily applied to the radiator header to receive the hose connection.

The invention will be more clearly understood from the following portions of this description, to be read in connection with the accompanying drawing, wherein:

Fig. 1 is an elevation of the fitting in the course of assembly of some of its components;

Fig. 2 is an elevation after the same components have been brought into assembled relationship;

Fig. 3 is a fragmentary end view taken from the tank end;

Fig. 4 is a side elevation;

Fig. 5 is a perspective of the assembled fitting; and

Figs. 6 through 9 are enlarged fragmentary sections taken through various joints.

As shown in the final assembly view, Fig. 5, the fitting comprises a hollow sheet metal member having two mating halves or side pieces 11 and 12, so formed by pressing or stamping as to have semicircular edges 13 at one end, and oval or circular edges 14 at the opposite end. The two halves 11 and 12 abut along their lengthwise dimensions through edges 15 which are formed true to assure close contact. In the embodiment illustrated, these edges lie in the medial plane of the assembled fitting, and herein is also located the center of the arcs 13. The arcs 14, however, while preferably also made circular, are struck from a radius 16 of less radius than that of the edges 13, and accordingly the center of the arcs 14 lies within the cavity of each half piece.

It will be seen that the circular end of the fitting is angularly inclined with respect to the oval end, and that the sectional profile of the fitting is gradually transformed from circular to somewhat elliptical—the arcs 14 merging into the straight edges 15 through tangential sections 17. This contouring preserves a hydraulic characteristic such that the flow velocity through the fitting decreases from the circular end to the elliptical end, thereby reducing turbulence in the cooling liquid and the absorption of air therein. Obviously, the diameter of the circular end is greater than the minor dimension, but less than the major dimension, of the opposite end. The minor dimension, however, is greater than the radius of the arcs 13.

The fitting further comprises a tank abutment plate 18 stamped from sheet metal into generally trapezoidal shape, the central portion of which is cut away to have the same profile as that of a section closely adjacent the elliptical opening of the fitting. This plate encircles the two side pieces to hold them in closely assembled relationship. The two semicircular edges 13 are similarly secured by a circular band 19, and which also provides a retaining ferrule for the hose thereafter placed over it.

Both the plate 18 and ring 19 are located with respect to the ends of the fitting by bumps 21, 22, respectively, struck out from the metal prior to assembly, and which may be formed when the side pieces are pressed. There are additional bumps 23 on the oval end, spaced from the bumps 21 the width of the plate 18. However, these preferably should not be formed prior to final assembly. This is because the external surfaces of the halves 11 and 12 are formed with a slight taper adjacent the curved portions 14, as will be apparent upon further inspection of Figs. 1 and 2. The dotted reference line T at the left of Fig. 1 is parallel to the edges 15, but is at an angle of a few degrees to the trace of the surface itself. The opening in the plate 18 is not large enough to pass over the elliptical end when the pieces 11 and 12 are matched, as shown in Figs. 2 and 5, and hence the pre-formation of both sets of bumps 21 and 22 would materially interfere with subsequent assembly.

With further reference to the assembly of the component parts, it is clear that the ring 19 may be press fitted over the mating edges 13 when the two halves are brought together, to abut the stop bumps 22 and thereby lock the circular end in place. However, as just noted, the taper of the side pieces at the opposite end precludes a similar assembly of the plate 18 unless either the plate metal of the ends or the side pieces themselves should be so permanently strained that a snug fit would not result. However, either piece 11 or 12 may be inserted oval end first through the opening of the plate 18 without such distortion.

Accordingly, one of the side pieces is brought up to the opening of the plate 18, is compressed slightly to bring its opposite edges 15 closer together, and then is snapped through the opening. Sufficient compression is, of course, applied to provide clearance for the bumps 21 or 23. This compression action, which in magnitude need be only a few thousandths of an inch, foreshortens the radius 16 so that the tapered and normally oversize oval portion 14 may pass through the opening. As the pressure is released, the piece regains its original dimension, as the stress has been within the limit of elasticity. At this time, however, the piece has also been moved through the opening to a region beyond the location of the bumps 23, and hence to a section of less major dimension than the half length of the opening. The piece may then be freely moved through the opening to a position indicated by the reference line R in Figs. 1 and 4, where the radius is still less than that of the arc 13. It may also be moved laterally, due to the more acute taper of the piece, so that the edges 15 are displaced from their normally occupied medial plane.

A clearance gap in the plate 18 is thus provided, through which the other side piece 12 or 11 may be inserted in the same manner. The side pieces may then be lined up against each other, and the end plate 18 driven down toward the oval end, or, as shown in Fig. 1, the plate 18 and one of the side pieces may be moved simultaneously, as in the direction of the arrows, to bring the three components into assembled relation. As the plate abuts the bumps 21, the edges of the opening ride up on the tapered surfaces of the arcuate portions 14, thus rigidly pulling the edges 15 together, and exerting a leverage action causing them to abut tightly throughout their extent.

The side pieces and end plate are thus brought into the relationship shown in Fig. 2, and the bumps 23 may then be struck out to prevent the plate 18 from sliding toward the circular end and thereby permit separation of the side pieces. The ring 19 is thereafter applied to serve as a hose ferrule and a further anchorage for the side pieces 11 and 12.

Thereafter, the assembled fitting may have the joints bonded and made watertight in any desired manner. A currently satisfactory practice is to coat the exterior surface of the joints with a brazing element or alloy, and subject the article to heat in a hydrogen brazing furnace. Hand soldering, which of course could be employed, is more expensive for mass production operations. Irrespective of the bonding procedure actually adopted, it is to be noted that the tightly engaging plate 18 and the ring 19 constitute not only parts which become integrated with the fitting, but also self-sustaining clamping fixtures for the side pieces during final assembly. Accordingly, the method of assembly, and the nature of the article itself, conjoin to permit thermal bonding of the joints without recourse to those special tools or fixtures which otherwise would be required to counteract thermal expansion effects. Adequate sealing of the joints by infiltration of the fused bonding metal is indicated by the fine shading in the several sectional views, which reflects the results obtained in actual practice.

Referring further to the fully assembled views, it will be noted that the plate 18 is provided with rivet holes 24 at its corners, and it is spaced by the bumps 21 and 23 a slight distance $d$ from the end of the fitting. This projecting portion $d$ is fitted into a compatible opening formed in the tank wall. The face of the plate 18 will then abut the tank, and as between such metals as copper and brass, a sufficiently tight joint can be obtained by soldering, rather than a high temperature brazing operation. This eliminates one of the disadvantages of the former cast iron fittings, wherein the heat input during the bonding operation often caused deformations of adjacent metal sufficient to destroy other bonded joints.

It will accordingly be seen that the invention provides a novel manner of forming an improved fitting, and while the description has been made with reference to a specific embodiment, it is not thereby intended to exclude those modifications and variations which are encompassed in the scope of the following claims.

I claim:

1. A sheet metal tank fitting comprising a pair of side pieces formed into generally curved channel shape each having juxtaposed abutting longitudinal marginal edges lying in substantially the same plane, one end of each piece having a semicircular contour struck on the same radius, the opposite end of each piece having a generally oval contour including a curved portion struck on a smaller radius merging into substantially parallel portions extending to said longitudinal edges, the distance between said longitudinal edges at said oval end being less than the diameter but greater than the radius of the semicircular end, the distance between said curved portions being greater than said diameter, the walls of said side pieces gradually changing in cross sectional contour from said semicircular end to said oval end, a unitary sheet metal plate encircling the side pieces adjacent the oval end, the longitudinal joints of the side pieces being sealed with bonding material.

2. A sheet metal tank fitting comprising a pair of elongated channel shaped members having longitudinal edges abutting each other, one end of the fitting having a circular opening and the opposite end of the fitting having a generally elliptical opening whose minor axis is less and whose major axis is greater in length than the radius of the circular opening, the cross sectional contour of the fitting outwardly tapering in one axial plane from substantially the circular end to the elliptical end, an end plate tightly surrounding the elliptical end of the fitting and extending outwardly therefrom substantially parallel to the plane of said elliptical end, a retaining ring positioned around the circular end, raised metal portions on said members positioning said plate and ring, and fused bonding metal along the joints to integrate the members, plate, and ring.

3. The method of making a tank fitting which comprises forming two elongated sheet metal channel shaped members each having a semicircular contour at one end and a substantially semi-elliptical contour at the opposite end, said members progressively changing in sectional contour from one end to the other to provide, when said members are abutted along their longitudinal edges, a circular opening at one end whose diameter is greater than the minor dimension but less than the major dimension of the opposite end, forming an end plate with an opening having dimensions slightly less than the maximum outside dimensions of said opposite end, inserting one of said members semielliptical end first through said opening and moving it longitudinally therethrough and laterally thereof, inserting the other of said members through said opening, shifting said members with respect to each other to bring their ends into alignment and their longitudinal edges into abutting relation, forcing the end plate toward the elliptical end to engage the outside surfaces of the members in tight engagement, engaging the outside surface of the circular end with clamping means, and sealing the longitudinal edges of the members with fused metal.

4. The method of making a tank fitting which comprises forming two complementary elongated sheet metal side pieces having a semicircular contour at one end gradually changing through a tapering wall portion to a semielliptical contour at the opposite end, said side pieces being channel shaped and having mating longitudinal marginal edges adapted to abut each other throughout the length of the fitting, forming the said opposite ends of the side pieces on their external surfaces with a slight outwardly flaring taper whereby the extremities of the pieces are of greater dimensions than the portions thereof immediately adjacent thereto, the diameter of the semicircular ends being greater than the minor axis but less than the major axis of the semielliptical end at said extremities, forming an end plate with an opening having a generally elliptical contour whose dimensions are slightly less than the external dimensions of the said opposite ends of the side pieces when positioned in mating relationship, compressing the semielliptical end of one of said side pieces and passing it through said opening to a region where it may be shifted laterally with respect thereto, displacing said side piece laterally with respect to the opening and passing the other side piece therethrough, adjusting said side pieces to bring their edges into mating and abutting relation, forcing the end plate toward the elliptical end to a position adjacent the extremity of the side pieces, pressing a ring over the circular end, and sealing the joints with fused metal.

5. The method of making a sheet metal tank fitting having a circular opening at one end, a generally elliptical opening at the opposite end, and a progressively changing cross sectional contour from one end to the other, wherein the diameter of the circular end is greater than the minor dimension but less than the major dimension of said opposite end and there is a region between said ends wherein the minor dimension does not exceed and the major dimension is less than the comparable dimensions at said elliptical opening, comprising forming two complementary elongated side pieces each having matching longitudinal edges and adapted when abutted along said edges and their ends to delimit said fitting, forming an end plate with an opening having a contour corresponding to that of said elliptical end but of slightly less dimension along at least one axis thereof, compressing the semielliptical end of one of said side pieces by a force within the elastic limit of said sheet metal and passing said end through said opening, shifting said side piece longitudinally and laterally with respect to the opening to provide a clearance gap, passing the semielliptical end of the other side piece through said opening, shifting said side pieces and plate to bring the edges and ends of the pieces into matching alignment with said plate pressed tightly over the elliptical end, forcing a circular ring over the circular end, and sealing the joints and bonding said side pieces, plate and ring with fusible metal.

FRANK W. PERSON, Jr.

REFERENCES CITED

The following references are of record in the file of this patent:

UNITED STATES PATENTS

| Number | Name | Date |
|---|---|---|
| 917,167 | Shaw | Apr. 6, 1909 |
| 1,678,744 | Olsen | July 31, 1928 |
| 2,101,311 | Duncan | Dec. 7, 1937 |